May 7, 1963     J. B. CATALDO     3,088,994
CLAMPED BUSWAY STRUCTURE

Filed Nov. 10, 1958     5 Sheets-Sheet 1

INVENTOR.
JOHN B. CATALDO
BY
ATTORNEYS

May 7, 1963 J. B. CATALDO 3,088,994
CLAMPED BUSWAY STRUCTURE
Filed Nov. 10, 1958 5 Sheets-Sheet 2
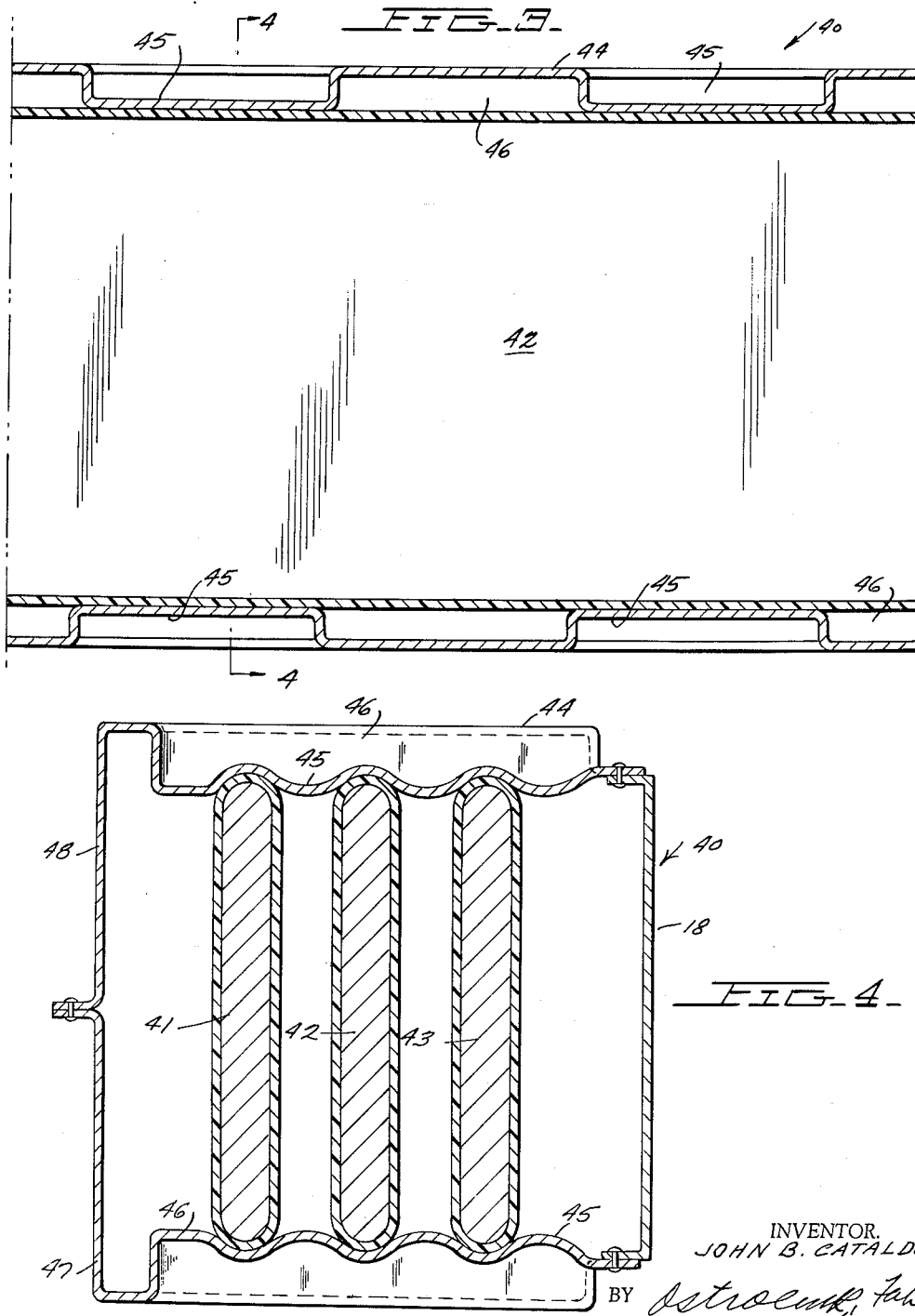
INVENTOR.
JOHN B. CATALDO
BY
ATTORNEYS May 7, 1963  J. B. CATALDO  3,088,994
CLAMPED BUSWAY STRUCTURE
Filed Nov. 10, 1958  5 Sheets-Sheet 3
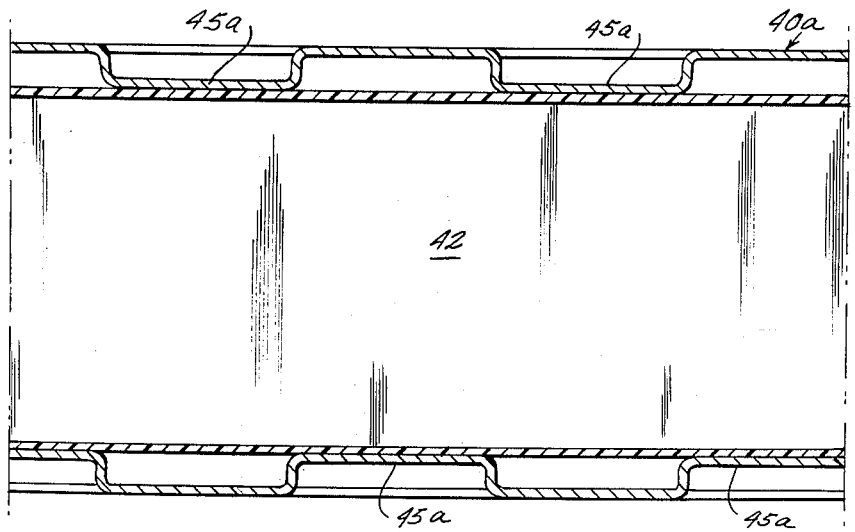
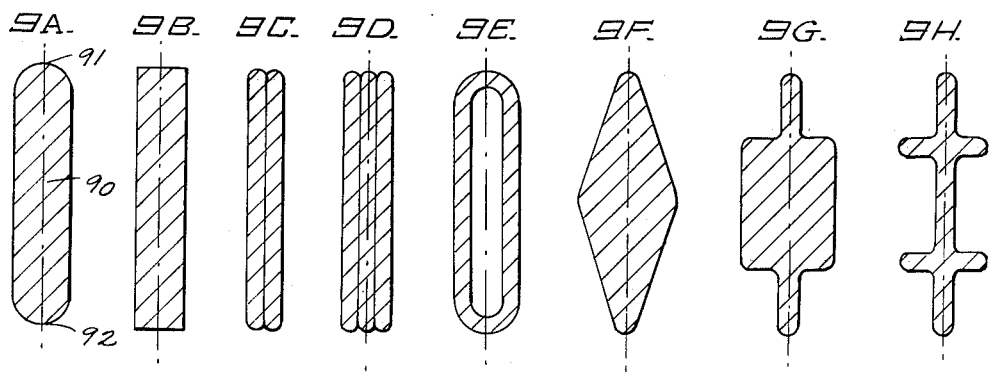
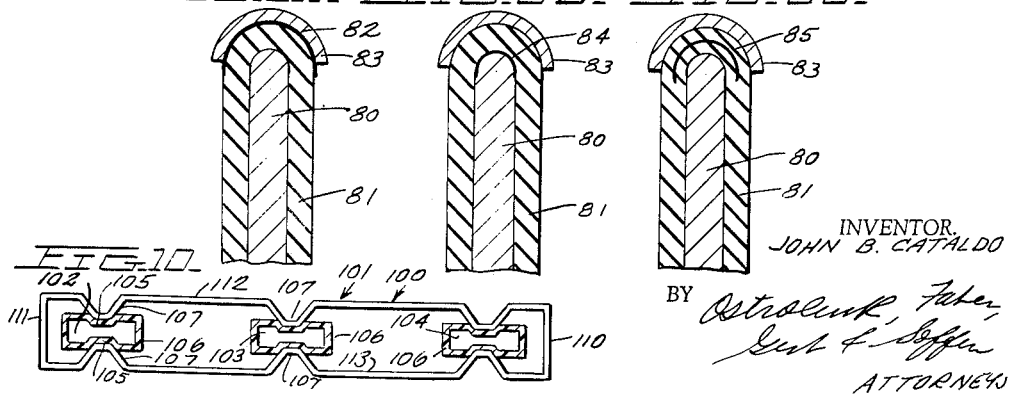
INVENTOR.
JOHN B. CATALDO
BY
ATTORNEYS May 7, 1963
J. B. CATALDO
3,088,994
CLAMPED BUSWAY STRUCTURE
Filed Nov. 10, 1958
5 Sheets-Sheet 4
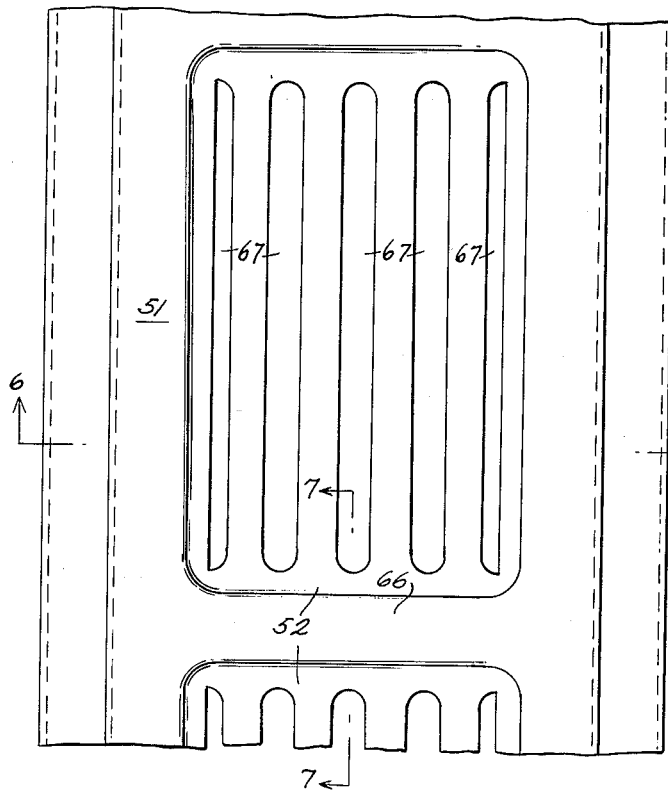
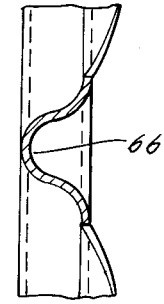
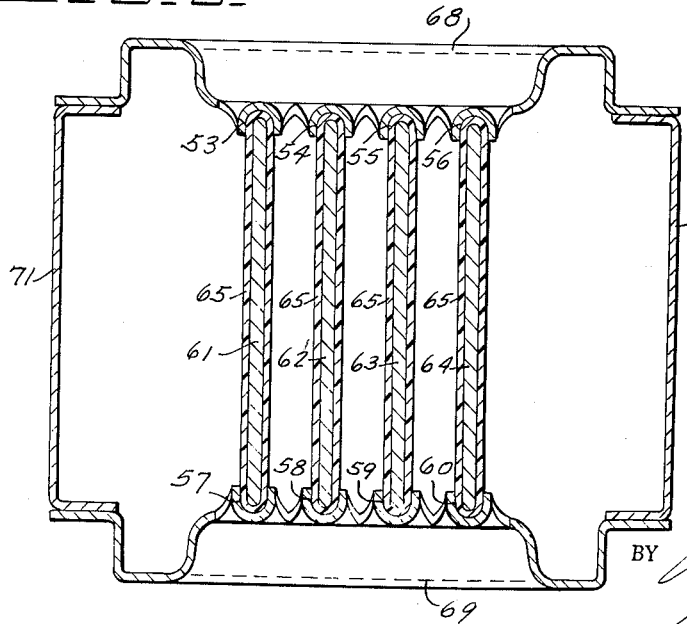
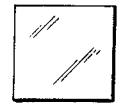
INVENTOR.
JOHN B. CATALDO
BY *Ostrolenk, Faber,*
*Gerb & Soffen*
ATTORNEYS May 7, 1963   J. B. CATALDO   3,088,994
CLAMPED BUSWAY STRUCTURE
Filed Nov. 10, 1958   5 Sheets-Sheet 5
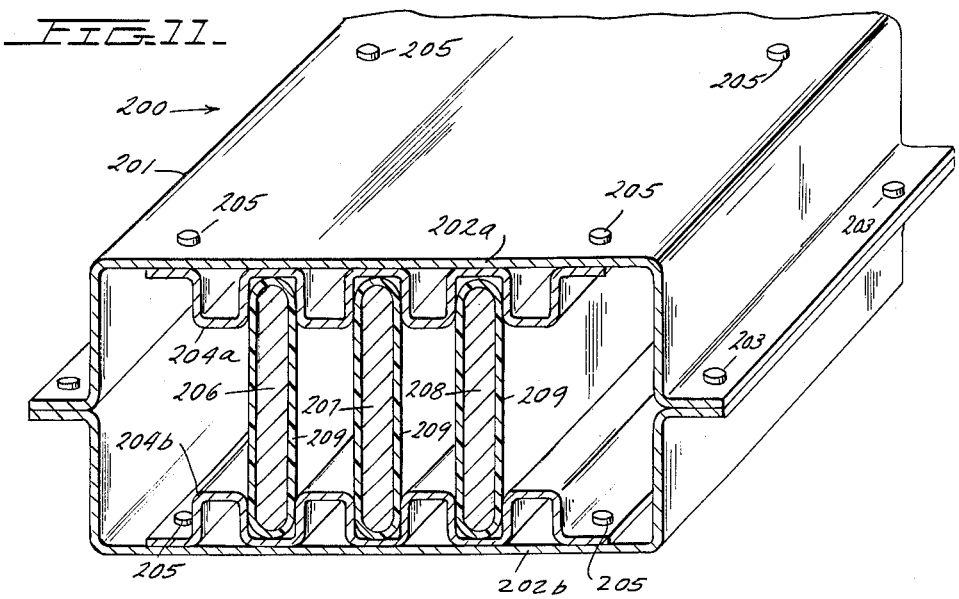
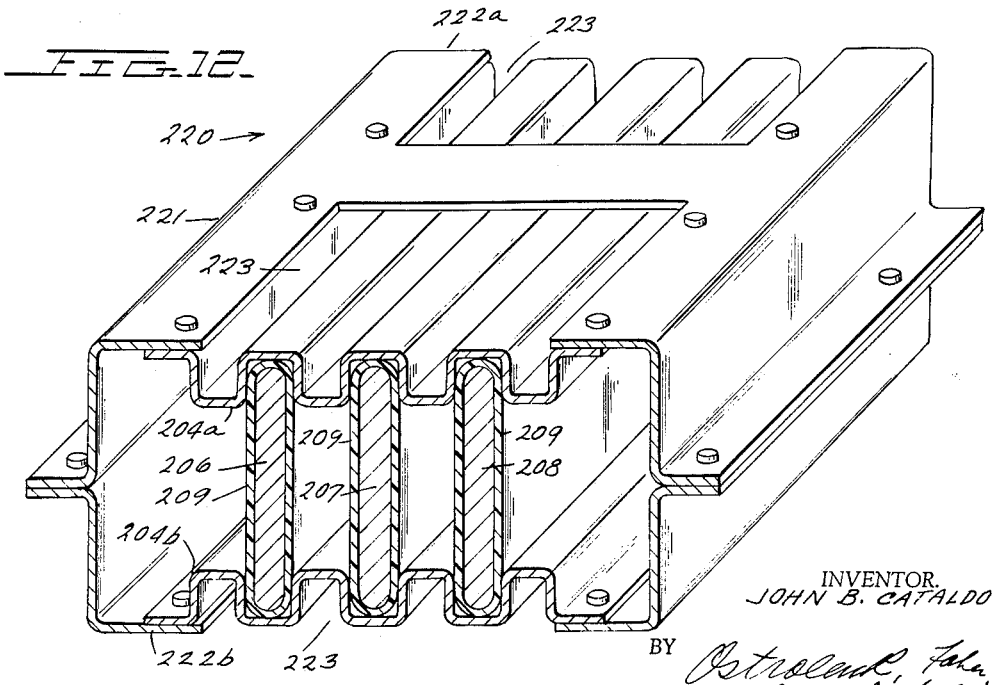
INVENTOR.
JOHN B. CATALDO
BY
ATTORNEYS

United States Patent Office 3,088,994
Patented May 7, 1963

3,088,994
CLAMPED BUSWAY STRUCTURE
John B. Cataldo, Birmingham, Mich., assignor to I-T-E Circuit Breaker Company, Philadelphia, Pa., a corporation of Pennsylvania
Filed Nov. 10, 1958, Ser. No. 772,814
1 Claim. (Cl. 174—99)

The instant invention relates to busways in general and more particularly to a busway in which the bus bars are clamped in place by suitable formations in the housing so as to provide mechanical support to the bus bars during short circuit conditions and to improve cooling conditions by providing a good heat conduction path between the bus bars and housing.

The ability of a piece of electrical apparatus to carry an electrical current is generally limited by the temperature rise achieved after a state of heat equilibrium has been reached. This temperature rise is the result of a balance between the heat generated by the current through the conducting members of the device, and the heat dissipated. If the mechanism for dissipating heat is improved in the device, then a larger amount of current can be conducted for the same temperature rise.

In prior art designs of busways, two principal methods for heat dissipation have been relied upon either alone or in combination, namely convection and radiation. In standard types of plug-in busways, bare bus bars are supported by insulator blocks spaced at longitudinal intervals within a totally enclosed metallic case. The primary heat loss in this construction is due to convection, wherein air circulating around the bus bars within the enclosure carries heat away from the bars.

In standard types of low-impedance busways, bus bars are brought close together for reduction of reactance. To improve electrical spacings, these bars are covered with thin insulating materials, such as varnished cambric, vinyl tape, etc. In so doing, the case is ventilated since the danger of contacting the live bars has been eliminated by the insulating covering around the bars.

While the act of bringing the bars closer together has reduced the cooling ability of air circulation between the bars, the ventilated case has helped restore heat dissipation through convection means by permitting cool air from the surroundings of the busway to flow between and around the bars. In addition, heat dissipation has also been helped by radiation from the insulating covering on the bars. But since the bars in most busways face each other, the radiation between bars has little effect since the surface temperature of the bars are likely to be approximately equal. It is only where opposing surfaces have dissimilar temperatures that heat loss due to radiation becomes appreciable. Thus, only between the end bars and the enclosure is heat loss through radiation effective in some low-impedance busways. Hence the primary means for heat dissipation for both ventilated and totally enclosed standard busways is by convection.

In its broadest form the instant invention contemplates an elongated housing wherein a plurality of spaced elongated bus bars are disposed. The housing is provided with formations whereby the bus bars are mechanically positioned and maintained by the direct clamping of the housing. Thus a relatively good heat conducting path is provided between the bus bars and case structure thereby utilizing conduction as a heat transfer means in order to improve the heat dissipating characteristics of the bus structure.

Briefly, the device of my invention comprises a plurality of edgewise mounted parallel bus bars which are clamped in place by the case. That is, the bus bars are usually of an elongated cross-section, with the case engaging the bus bars at the ends of the long dimension of the cross-section.

The bus bars are covered with a thin layer of electrical insulation. The busway enclosure includes embossments or corrugations forming pockets into which the narrow edges of the bus bars, in cases where the bus bar cross-sections are elongated, are entered with the surfaces forming the pockets being in intimate contact with the insulating covering of the bus bars. This results in the ready transfer of heat, by conduction, from the bus bars, through their insulation, directly to the busway case whose outside surfaces are favorably disposed for cooling by way of convection and radiation.

The pockets in which the bus bars are disposed extend parallel to the longitudinal axis of the busway and may be continuous or intermittent. That is, one pocket may extend for the entire length of the enclosure or else the pocket may be split into sections. With either configuration, the bus bars are clamped in place for a substantial portion, if not their entire lengths.

This extensive support makes possible the use of very thin bus bars which provide increased surface areas for cooling by radiation and convection. From a mechanical and short circuit strength standpoint the previous methods of widely spaced single point supports of bus bars limited the minimum thickness of bars that could be employed in busways, due to their lower resistance to bending or lateral movement. Since the resistance of bus bars to motion varies as the cube of the thickness, any attempts to decrease the thickness of the bars led to very low resistance to short circuit forces. Compensation for such decreased force resistance by more frequent spacing of single point supports is impractical and costly in standard busway designs. By means of the extensive, if not continuous case support, where no auxiliary insulators are involved, the bar thickness can be reduced materially while retaining almost unlimited short circuit strength.

While the bus bars are usually of elongated cross-section, they may also be of any cross-sectional shape even square or circular. In the case of circular bus bars, the housing pockets engage the bus bars at approximately opposite portions of the circumference. In the case of square cross-sectioned bus bars the housing includes appropriately shaped pockets for receiving portions of the bus bars.

The housing in its usual form is of a multi-piece metallic construction. However, the construction may take the form of a single extruded member of either a conducting or insulating material. If an insulating material is chosen then it usually is not necessary to coat the bus bars with an insulating layer.

Accordingly, a primary object of the instant invention is to provide a novel busway construction which does not require spacing blocks to maintain the bus bars in spaced parallel relationship and insulate the bus bars from the housing.

Another object is to provide a novel busway in which the housing clamps the bus bars in place thereby utilizing heat conduction for purposes of cooling the bus bars.

Still another object is to provide a novel busway in which the bus bars are given extensive support so that thin bars may be used and still be capable of resisting the deforming magnetic forces of high currents.

A still further object is to provide a novel busway whose housing includes opposite surfaces formed with longitudinally extending pockets which receive the edges of the bus bars.

Yet another object is to provide auxiliary insulating means disposed in the clamping regions of a busway in which the bus bars are directly clamped by the housing.

These objects as well as other objects of the instant invention shall become readily apparent after reading the following description of the accompanying drawings in which:

FIGURE 3 is a fragmentary sectionalized side view of another modification of a busway constructed in accordance with the teachings of the instant invention.

FIGURE 3A is a view similar to FIGURE 3 illustrating a modified housing structure.

FIGURE 4 is a cross-section of FIGURE 3 through line 4—4 looking in the direction of the arrows 4—4.

FIGURE 5 is a fragmentary plan view of still another modification of a busway constructed in accordance with the instant invention.

FIGURES 6 and 7 are cross-sections of FIGURE 5 through lines 6—6 and 7—7, respectively, looking in the direction of arrows 6—6 and 7—7 respectively.

FIGURES 8A–8C are fragmentary cross-sections illustrating different arrangements of supplementary insulators.

FIGURES 9A–9J are end views of differently shaped bus bars which may be clamped directly by the busway housing.

FIGURE 10 is a transverse cross-section of still another embodiment of this invention in which the busway housing is of single piece construction and the bus bars are mounted in edge to edge relationship while being clamped at the body portions thereof rather than along the edges.

FIGURES 11 and 12 are fragmentary perspective views of two more variations of the instant invention.

Figure 1:
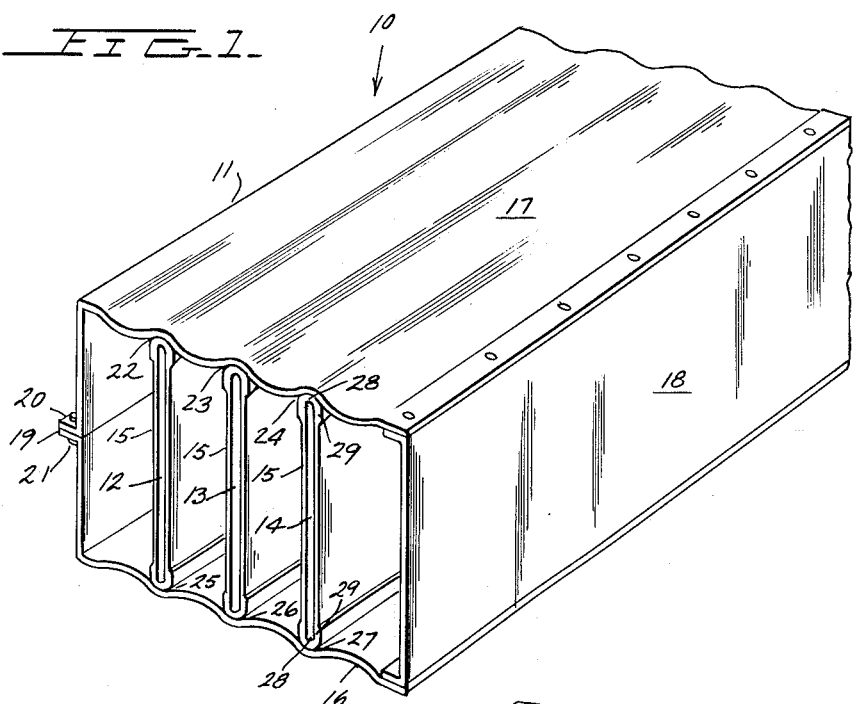
FIGURE 1 is a perspective view of a busway section constructed in accordance with the principles of the instant invention.

Now referring to the figures and more particularly to FIGURE 1, busway 10 comprises an elongated metallic housing 11 having parallel spaced bus bars 12–14 disposed therein and extending longitudinally thereof. Each of the bus bars 12–14 is a flat member covered by a thin insulating coating 15 such as butyl rubber.

Housing or case 11 is formed of two identical sections 16, 17 riveted or otherwise secured to opposite legs of channel support 18. Sections 16, 17 are secured to each other at their longitudinally extending flanges 19, 20, respectively by a plurality of fastening means 21 each comprising a bolt, nut and appropriate lock washer.

Each housing section 16, 17 includes a plurality of longitudinally extending corrugations forming pockets 22–27.

Each of the sections 16, 17 may be formed by extrusion or in the alternative be formed from flat sheets which are rolled, bent, and otherwise operated upon to achieve the desired shape.

The narrow edges 28 of the bus bars 12–14 are rounded and are disposed within pockets 22–27. That is, bus bar 12 is received by pockets 22 and 25, bus bar 13 by pockets 23 and 26, and bus bar 14 by pockets 24 and 27. It is to be noted that insulating coating is thickened in the regions 29 overlying the narrow edges 28 of the bus bars 12–14. This assures a snug fit despite manufacturing imperfection.

Thus bus bars 12–14 are disposed within case 11 in spaced parallel relationship and are clamped between the sections 12–14 which provide support for bus bars along the entire lengths thereof so as to prevent distortion of bus bars 12–14 when busway 10 is subjected to short circuit currents. Insulation 15 is of a sufficient thickness to provide dielectric strength between the bus bars 12–14 and case 11 as well as to provide dielectric strength between the bus bars 12–14. However, insulation 15 is sufficiently thin so that heat generated by the current carried by bus bars 12–14 is readily conducted through their respective insulation 15 to the case 11 where it may be effectively dissipated by convection and radiation. Outside bus bars 12 and 14, because of their large surface areas, are also efficient radiators on their sides facing the walls of case 11.

Busway 30 (FIGURE 2) is quite similar to busway 10 differing therefrom in that housing 31 of busway 30 includes elongated openings 32 in the valleys of the corrugations thereby providing a ventilated busway. Housing sections 33 and 34 may be split extrusions or else be formed by bending, rolling, and stamping a sheet material.

Busway 40 (FIGURES 3 and 4) comprises edgewise mounted insulation covered bus bars 41–43 disposed within case 44 which includes intermittent corrugated sections 45 forming clamping areas for bus bars 41–43.

Housing sections 47 and 48 are secured to each other and to channel 18 by the same manner of securement as housing sections 16 and 17 (FIGURE 1).

Figure 2:
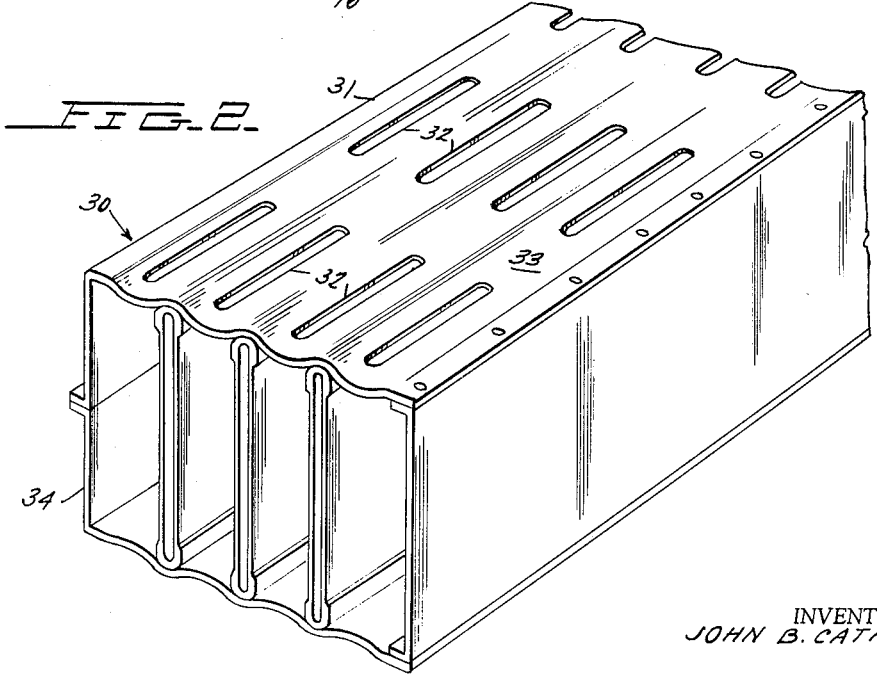
FIGURE 2 is a perspective view illustrating a fragmentary portion of a busway which is a modification of that illustrated in FIGURE 1.

While the heat conducting areas between the case 44 and bus bars 41–43 are not as extensive as in FIGURES 1 and 2, the sections 46 between corrugated sections 45 strengthen case 44 and also permit the air within case 44 to freely circulate thereby reducing the possibility of developing any particularly hot spots. It is to be noted that corrugated sections 45 are extensive enough to provide a good deal of lateral support for bus bars 41–43 against deformation by the magnetic forces accompanying high currents.

In FIGURES 3 and 4, the corrugated sections 45 engaging the top edges of bus bars 41–43 are opposite the corrugated sections 45 engaging the lower edges of the bus bars 41–43. FIGURE 3A illustrates a busway 40a in which the corrugated clamping areas 45a of the opposed housing surfaces are in staggered relationship.

FIGURES 5–7 illustrate a busway 50 whose housing 51 includes semi-continuous clamping areas 52 having semi-circular embossed pockets 53–60 which receive the narrow edges of bus bars 61–64. Bus bars 61–64 are each covered with a thin coating of insulation 65.

The joining areas 66 between clamping areas 52 are void of apertures and are arched away from the edges of bus bars 61–64 to improve air circulation within case 51. Circulation is further improved by the inclusion of elongated apertures 67 in the clamping areas 52 on each side of the pockets 53–60.

Housing 51 comprises identical top and bottom sections 68, 69 which include the clamping areas 52 and joining areas 66 therebetween. Top and bottom sections 68, 69 are secured in any suitable manner to opposite legs of channels 70 and 71 which form the sidewalls of housing 51 thereby completing the enclosure.

In the busways hereinbefore described, the bus bars have been described as being encased in a thin flexible insulating cover such as butyl rubber. For some applications it is necessary to add an auxiliary insulator in the region where the bus bars are clamped by the housing in order to provide mechanical resistance to puncturing of the flexible insulating cover.

FIGURES 8A–8C illustrate three modifications of the auxiliary insulator. FIGURE 8A illustrates a flat bus bar 80 having a thin flexible insulating coating 81 and an auxiliary arched insulator 82 interposed between coating 81 and the clamping portion 83 of the busway housing. In the embodiment of FIGURE 8B arched auxiliary insulator 84 is interposed between bus bars 80 and clamping portion 83 while in the embodiment of FIGURE 8C auxiliary insulator 85 is embedded in coating 81 in the region where bus bar 80 is clamped by housing portion 83.

The last mentioned embodiment is similar to cable and like application where abrasion and mechanical characteristics are necessary in addition to the electrical insulation properties. Auxiliary insulators 82, 84, 85 may be comprised of post-formed phenolic or other rigid material placed between the housing 83 and bus bar insulation 81. However, auxiliary insulators 82, 84, 85 may be comprised of flexible materials such as glass fibre cloth or tape, or other like materials having good heat and abrasive resistance characteristics.

While the bus bar 80 is shown having rounded edges, this is not essential in all cases especially where an auxiliary insulator of rigid material is utilized.

While the busways hereinbefore described have each utilized flat bus bars having rounded edges, as in FIGURE 9A, a clamped busway structure constructed in accordance with the instant invention may also utilize bus bars which are laminated, oval, tubular, or irregularly shaped. The cross-sections of some suitable different bus bar constructions are illustrated in FIGURES 9B–9J.

The edges of bus bar 90 (FIGURE 9B) having an elongated rectangular cross-section are not rounded and may be used successfully when auxiliary insulators are included. FIGURES 9C and 9D illustrate laminated bus bars, FIGURE 9E illustrates a hollow bus bar, FIGURE 9F illustrates an elongated diamond shaped bus bar, while FIGURES 9G and 9H illustrate irregularly shaped bus bars with the bus bar of FIGURE 9H being non-symmetrical about a horizontal axis. Bus bars of the type illustrated in FIGURE 9H may be somewhat interleaved thereby reducing reactance losses.

It is to be noted that each of the bus bars of FIGURES 9A–9H comprises a cross-sectional area having a major axis coaxial with the vertical centerlines, defining the long dimensions of each area. The narrow edges of these bus bars (such as edges 91 and 92 of bus bar 90) are disposed at the ends of each major axis and each of the narrow edges is adapted for cooperation with the busway housing for direct clamping of the bus bars. However, it is to be understood that the utilization of bus bars having round (FIGURE 9I) and square (FIGURE 9J) cross-sections is within the scope of this invention.

While the housings of busways 10, 30 and 40 have been illustrated as comprising a channel at one side and a flanged construction at the opposite side, it should be understood that both sides may be of identical construction. That is, both sides of the busway housing may be comprised of channels (as in FIGURE 6) or else both sides may be of a flanged construction in which event the housing is formed of only two sections.

Busway 100 (FIGURE 10) comprises an elongated housing 101 of single piece construction as by extrusion. Elongated bus bars 102–104 are of elongated cross-section and mounted in edge-to-edge relationship rather than face-to-face relationship as in the embodiments previously described.

Each of the bus bars 102–104 is formed with a longitudinally extending groove or pocket 105 in each of the faces thereof. A thin layer of insulation 106 covers each of the bus bars 102–104 thereby forming linings for pockets 105. Housing 101 is formed with inwardly extending formations or clamping areas 107 which are received by bus bar pockets 105 for cooperation therewith in preventing lateral movement of bus bars 102–104.

The housing 101 is constructed of a material of sufficient resiliency so that a compressive force applied between surfaces 110, 111 will cause the other housing surfaces 112, 113 to bow outward thereby increasing the spaces between the clamping areas 107 in opposite surfaces 112, 113. With clamping areas 107 spread apart bus bars 102, 104 may be moved into place within housing 101. After the compressive force between surfaces 111, 112 is relaxed the housing returns to its original shape with the clamping areas 107 firmly engaging the bus bars 102–104.

Housing 101 may be comprised of an insulating rather than a conducting material in which case the insulation 106 is required only if the bus bars 102–104 are closely spaced.

Busway 201 (FIGURE 11) includes a housing 201 comprised of an elongated shell formed of symmetrical sections 202a, 202b, which are joined along longitudinally extending flanges by suitable fastening means 203, and corrugated members 204a, 204b, which are disposed within the shell and are secured to members 202a, 202b, respectively, by rivets 205. Flat bus bars 206–208, each having a thin insulating covering 209, are disposed within housing 201 in face to face relationship with the narrow edges of bus bars 206–208 being disposed within the longitudinally extending grooves of corrugated members 204a, 204b.

Each of the corrugated members 204a, 204b may be comprised of many sections placed end to end or else be continuous for the entire length of busway 201. It is to be noted that corrugated members 204a, 204b are in intimate contact with shell 202a, 202b. This provides a good heat conducting path between bus bars 206–208 and shell 202a, 202b.

Busway 220 (FIGURE 12) is similar in construction to busway 200 (FIGURE 11) except that shell 222a, 222b of housing 221 is provided with rectangular cut out portions 223 positioned at intervals along the length thereof so that heat transfer from the surface of the corrugated members takes place directly to the air surrounding busway 220.

The corrugated members of FIGURES 10 and 11 may be constructed of a relatively rigid insulating material in which event the insulating covering of the bus bars may often be eliminated.

Thus, I have provided a novel busway construction wherein the spaced parallel bus bars, covered with a thin layer of insulation, are clamped in place directly by the housing sections. This results in good heat conduction from the bus bars to the case and also results in mechanical support for the bus bars over an extended length so that the thickness of the bars may be reduced without adversely affecting the ability of the bus bars to resist deformation upon the occurrence of a short circuit.

Although I have here described a preferred embodiment of my novel invention, many variations and modifications will now be apparent to those skilled in the art, and I therefore prefer to be limited, not by the specific disclosure herein, but only by the appending claim.

I claim:

A busway comprising a housing and a plurality of equally spaced parallel bus bars, at least three in number, disposed within said housing; said bus bars having the major axis of their cross-section parallel to each other; insulating means comprising a thin layer covering substantially the entire outer surface of said bus bars to form a unitary insulated bus bar; said housing having bar clamping areas formed in opposite surfaces thereof, each of said insulated bus bars having a first and a second of the insulation covered edge thereof firmly engaged by said clamping areas along a substatnal portion of the length of said bus bar to thereby provide a heat-conducting path from said bus bars to said housing; said clamping areas comprising the sole support for said bus bars; said clamping areas including a longitudinal pocket having a transverse dimension adapted to snugly contain said first and second edge of said unitary insulated bus bar; each of said opposite surfaces having a plurality of longitudinally spaced embossed areas constituting said clamping areas; said embossed areas being at least as long as the joining areas between embossed areas; said joining areas being arched away from the second bus bar edges for improved air circulation; said joining areas being closed.

References Cited in the file of this patent

UNITED STATES PATENTS

| | | |
|---|---|---|
| 2,057,891 | Frank | Oct. 20, 1936 |
| 2,128,995 | Fisher et al. | Sept. 6, 1938 |
| 2,261,857 | Novak et al. | Nov. 4, 1941 |
| 2,372,267 | Frank et al. | Mar. 27, 1945 |
| 2,938,942 | Stanback et al. | May 31, 1960 |
| 3,011,011 | Christensen | Nov. 28, 1961 |
| 3,018,320 | Rowe | Jan. 23, 1962 |

FOREIGN PATENTS

| | | |
|---|---|---|
| 458,057 | Canada | July 12, 1949 |

OTHER REFERENCES

"Westinghouse Bus Duct Manual," page 6. Published by Westinghouse Electric Corporation, Beaver, Pa.